Patented May 28, 1940

2,202,048

UNITED STATES PATENT OFFICE 2,202,048

LUMINOUS MATERIAL AND A METHOD FOR MANUFACTURING THE SAME

Josef Einig, Berlin-Friedrichshagen, and Gerhard Stahlberg, Berlin-Grunau, Germany, assignors, by mesne assignments, to Schering Corporation, Bloomfield, N. J., a corporation of New Jersey No Drawing. Application May 22, 1937, Serial No. 144,298. In Germany May 28, 1936

7 Claims. (Cl. 250—81)

This invention relates to the manufacture of luminous layers containing zinc sulphide which are unchanged by daylight, atmospheric influences and the like.

It is known that luminous paints containing zinc sulphide, such as are used for various purposes, for example for the manufacture of X-ray screens, X-ray films, luminous signs and other purposes, after a more or less long period become discoloured and lose their illuminating power under the influence of day-light and the atmosphere. Various means have already been proposed for avoiding this difficulty. Thus colour filters have been interposed in front of the illuminating layers, a means which, however, is only of incomplete effect.

According to the present invention a simple means is provided by means of which it is possible to remove this inconvenient property of luminous paints containing zinc sulphide. For this purpose the luminous layers produced in the customary manner are treated with alkali silicate solutions of suitable concentration. Such treated luminous layers exhibit, compared with untreated layers, a considerably greater resistance to the influences of day-light and the atmosphere.

As binding agent for the luminous salts, for example nitro-lacquers can be employed. Instead of the nitro-lacquer also other lacquers can be used, as for example cellulose acetate lacquers, resin lacquers and others. The present invention is of particular value when as binding agent for the luminous salts the lacquers are used of a basis of the polystyrenes which have recently come into considerable use, since with the application of polystyrenes as binding media the brightness of the screens is considerably greater than with any other known binding medium.

Hitherto screens with such strongly water repellant lacquers have suffered from the disadvantage that the luminous salt decomposes very rapidly under the influence of sunlight or daylight, whereby the advantage achieved by the application of polystyrenes and the like becomes illusory. According to this invention likewise the disadvantages of the application of such lacquers can be avoided when the treatment is carried out with such alkali silicate solutions the alkalinity of which has been increased by suitable methods. This has also the advantage for all types of layers that the period of treatment can be essentially reduced.

The increase of the alkalinity takes place most suitably by the addition of alkali hydroxide solutions but also other additions can be made which have the effect of increasing the alkalinity of the solutions. The treatment of the screens takes place most advantageously by simple immersion in such solutions.

In this after treatment the concentration of the treating solution can be varied to a far reaching extent without detriment. Thus in general solutions are suitable the concentration of which of alkali silicate lies between 3 and 25%, but obviously the choice of the concentration depends upon the composition and nature of the luminous layer, the duration and the temperature of the treatment. A suitable concentration of alkali hydroxide lies for example between 5 and 20%.

The following examples illustrate the invention:

Example 1

An X-ray film, as can be obtained for example by pouring a nitro-lacquer containing zinc-cadmium sulphide on a glass plate and evaporating the solvent, is after drying detached from the glass plate and treated for several hours in a bath of 5% of water glass at room temperature. The screen is removed from the bath, superficially washed with water, dried and placed in the customary manner on a suitable base such as paste-board, artificial resin or the like. A screen so treated is distinguished from screens at present on the market by a very much greater resistance to daylight and atmospheric influences.

Instead of the zinc-cadmium sulphide it is also possible to use another suitable luminous material and to produce the luminous films in other ways than that described, as is customary in the art.

Example 2

An X-ray film as is obtained by pouring out a polystyrene solution, for example a "Ronilla" solution containing a luminous salt on a glass plate with evaporation of the solvent, is after drying detached from the glass plate and treated for several hours in a bath consisting of equal parts of 10% caustic soda lye and 10% water glass at room temperature. Thereupon the film is superficially washed with water, dried and mounted in the customary manner on a suitable base such as paste-board, artificial material or the like. By means of this process it is possible for the first time to exploit the valuable properties of such screens, namely the great brightness.

Of course, many other changes and variations may be made by those skilled in the art in accordance with the principles set forth herein and in the claims annexed hereto.

What we claim is:

1. A method of treating an organic X-ray or other fluorescent film having luminous material in said film, said material being taken from the class consisting of zinc and cadmium sulphides, which comprises immersing said film in an alkali metal silicate solution, and then drying said treated film, whereby there is imparted to said luminous material increased resistance to the discoloring effect of sunlight.

2. A method of treating an organic X-ray or other fluorescent film having luminous material in said film, said material being taken from the class consisting of zinc and cadmium sulphides, which comprises immersing said film in an alkali metal silicate solution for several hours, and then drying said treated film, whereby there is imparted to said luminous material increased resistance to the discoloring effect of sunlight.

3. A method of treating an organic X-ray or other fluorescent film having luminous material in said film, said material being taken from the class consisting of zinc and cadmium sulphides, which comprises immersing said film in an alkali metal silicate solution containing from 3% to 25% of silicate, and then drying said treated film, whereby there is imparted to said luminous material increased resistance to the discoloring effect of sunlight.

4. A method of treating an organic X-ray or other fluorescent film having luminous material in said film, said material being taken from the class consisting of zinc and cadmium sulphides, which comprises immersing said film in an alkali metal silicate solution, subjecting the film to superficial rinsing with water, and then drying said treated film, whereby there is imparted to said luminous material increased resistance to the discoloring effect of sunlight.

5. A method of treating an organic X-ray or other fluorescent film having luminous material in said film, said material being taken from the class consisting of zinc and cadmium sulphides, which comprises immersing said film in an alkali metal silicate solution containing from 3% to 25% of silicate and 5% to 20% of alkali metal hydroxide, and then drying said treated film, whereby there is imparted to said luminous material increased resistance to the discoloring effect of sunlight.

6. Luminous X-ray or other fluorescent film comprising a film of organic film-forming material, luminous material taken from the class consisting of zinc and cadmium sulphides uniformly distributed throughout said film, and alkali metal silicate within said film but at the surface only thereof, said silicate having been impregnated into the completed film.

7. Luminous X-ray or other fluorescent film comprising a film of organic film-forming material taken from the class consisting of polystyrene, nitrocellulose, cellulose acetate and resin lacquers, luminous material taken from the class consisting of zinc and cadmium sulphides uniformly distributed throughout said film, and alkali metal silicate within said film but at the surface only thereof, said silicate having been impregnated into the completed film.

JOS. EINIG.
GERHARD STAHLBERG.